United States Patent [19]

Cormier

[11] Patent Number: 4,919,366
[45] Date of Patent: Apr. 24, 1990

[54] HEAT RESISTIVE WALL ASSEMBLY FOR A SPACE VEHICLE

[75] Inventor: Leonard N. Cormier, Reno, Nev.
[73] Assignee: MMI Incorporated, Reno, Nev.
[21] Appl. No.: 248,412
[22] Filed: Sep. 23, 1988
[51] Int. Cl.$^5$ .............................. B64C 1/38; B64G 1/58
[52] U.S. Cl. ................................. 244/160; 244/119 R; 244/158 R; 244/163; 244/158 A; 220/421
[58] Field of Search ............... 244/119, 117 R, 117 A, 244/158 R, 158 A, 163; 220/421, 424; 62/45

[56] References Cited

U.S. PATENT DOCUMENTS

| | | |
|---|---|---|
| 1,837,907 | 12/1931 | Hurley . |
| 2,451,486 | 10/1948 | Horton . |
| 2,617,551 | 11/1952 | Hopkins . |
| 2,983,401 | 5/1961 | Murphy . |
| 3,009,601 | 11/1961 | Matsch . |
| 3,144,160 | 8/1964 | Johnson et al. . |
| 3,149,742 | 9/1964 | Hay et al. . |
| 3,150,793 | 9/1964 | Messer . |
| 3,179,549 | 4/1965 | Strong et al. . |
| 3,215,313 | 11/1965 | Stelts . |
| 3,230,726 | 1/1966 | Derner et al. . |
| 3,302,358 | 2/1967 | Jackson . |
| 3,347,402 | 10/1967 | Forman et al. . |
| 3,361,285 | 1/1968 | Alleaume . |
| 3,365,897 | 1/1968 | Middleton et al. ..................... 62/45 |
| 3,365,897 | 1/1968 | Middleton et al. . |
| 3,415,408 | 12/1968 | Seitz ..................................... 220/421 |
| 3,525,452 | 8/1970 | Hofmann . |
| 3,595,423 | 7/1971 | Yamamoto . |
| 3,612,447 | 10/1971 | Newsom .......................... 244/117 A |
| 3,622,030 | 11/1971 | Yamamoto . |
| 3,719,302 | 3/1973 | Hamilton . |
| 3,721,362 | 3/1973 | Bridges et al. . |
| 3,724,228 | 4/1973 | Sollami et al. . |
| 3,799,056 | 3/1974 | Colignon ............................ 244/163 |
| 4,149,652 | 4/1979 | Ohsaka et al. . |
| 4,151,800 | 5/1979 | Dotts et al. . |
| 4,195,746 | 4/1980 | Cottrell . |
| 4,344,591 | 8/1982 | Jackson ............................ 244/158 A |
| 4,389,030 | 6/1983 | Miguel . |
| 4,439,968 | 4/1984 | Dunn ............................... 244/158 A |
| 4,461,398 | 7/1984 | Argy .................................... 220/423 |
| 4,804,571 | 2/1989 | Jouffrean ......................... 244/158 A |

FOREIGN PATENT DOCUMENTS

| | | |
|---|---|---|
| 54-44217 | 4/1979 | Japan . |
| 54-109618 | 8/1979 | Japan . |
| 55-119298 | 9/1980 | Japan . |

OTHER PUBLICATIONS

Insulating Products & Accessories for Original Equipment Manufactures, by Johns-Manville discussing J-M Flexible Min-K.
Insulating Products & Accessories for Original Equipment Manufacturers, by Johns-Manville, J-M Min-K molded insulation.
Insulating Products & Accessories for Original Equipment Manufactures, by Johns-Manville discussing "J-M Min-K, A Scientific Breakthrough in Thermal Insulation".
"INCONEL Alloy 617", by Huntington Alloys, Inc., 1979.
"Successful Applications of Beryllium Sheet Materials to Satellite Structures", by Larry A. Grant, dated May 1983.
"Designing With Beryllium", by Brush Wellman, Inc.
"Linde Company Super Insulation Applied to Space Vehicles", by C. R. Lindquist, Revised Dec. 1, 1962.

Primary Examiner—Galen Barefoot
Attorney, Agent, or Firm—Sixbey, Friedman, Leedom & Ferguson

[57] ABSTRACT

A heat-resistive wall assembly for a space vehicle is disclosed herein comprising an inner wall formed from either wrought beryllium or aluminum for providing both structural support for the vehicle, as well as a heat sink which equilibrates the heat gradient around the vehicle during reentry, an outer wall preferably formed from interlocking panels of a honeycomb laminate of a heat resistive metal such as Inconel ® 617, and an evacuated jacket formed from an envelope of nickel foil which is disposed between the inner and outer walls. The evacuated jacket contains an insulating material formed from alternating layers of a sheet material made from nonwoven quartz fibers, and sheets of nickel foil. Even though the interior of the wall assembly is exposed to ambient atmospheric pressure, such atmospheric pressure is insufficient to compress the evacuated jacket during the maximum heat experienced by the vehicle during reentry into the atmosphere. Thus the evacuated jacket maintains an expanded heat flux retarding position when the heat load upon the vehicle wall assembly is at its highest.

34 Claims, 6 Drawing Sheets

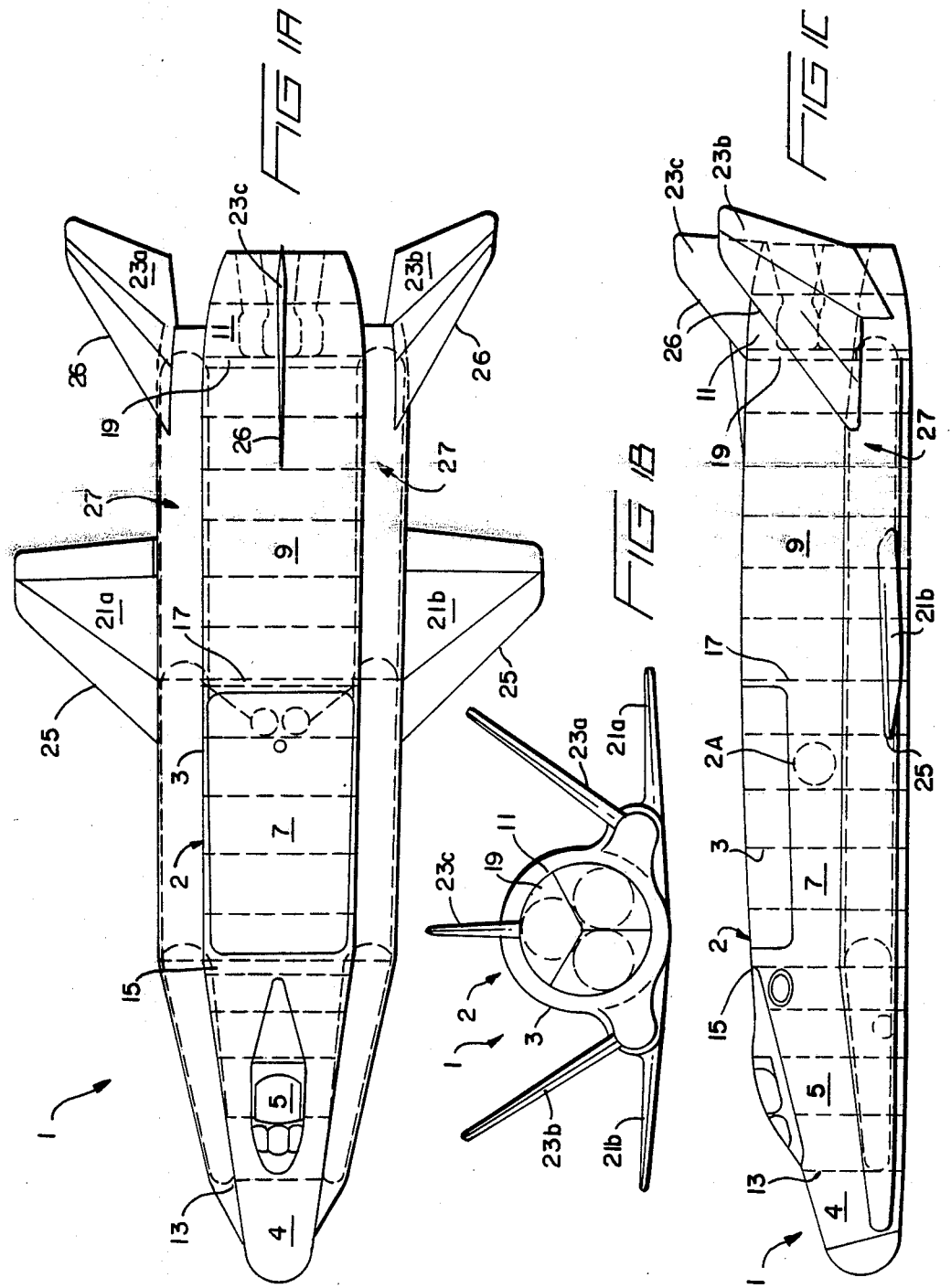

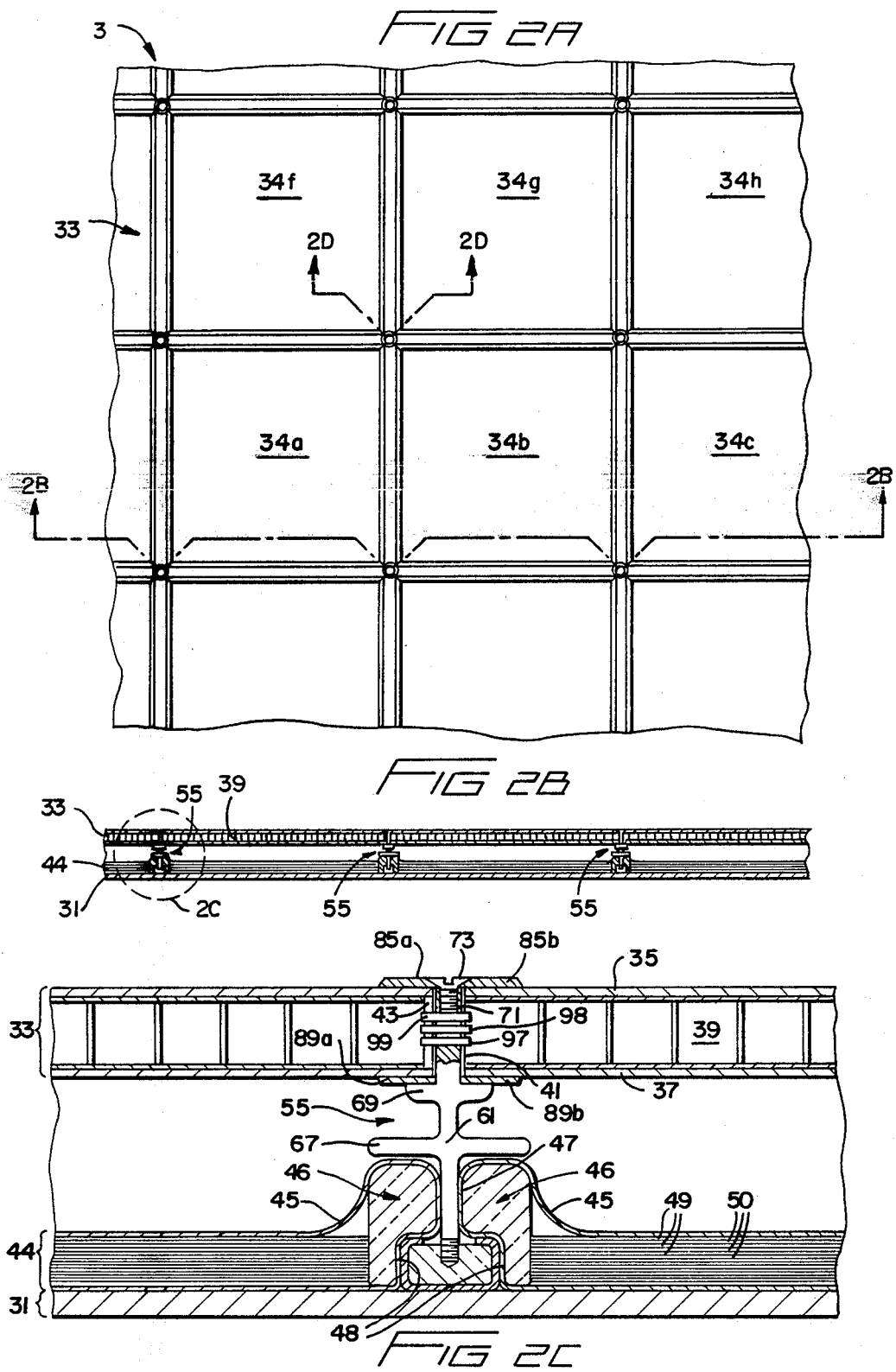

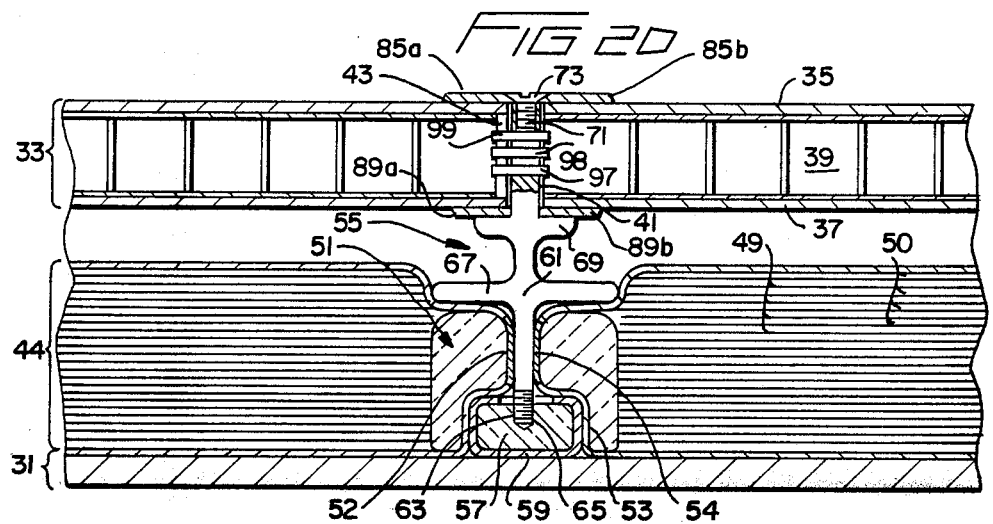
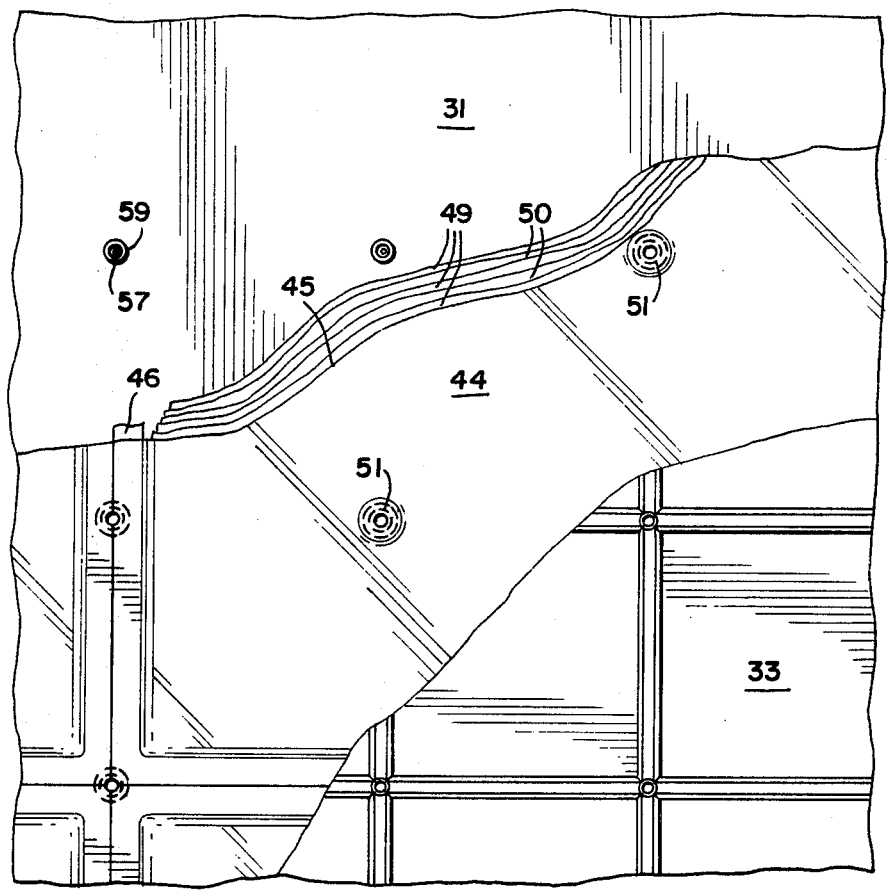

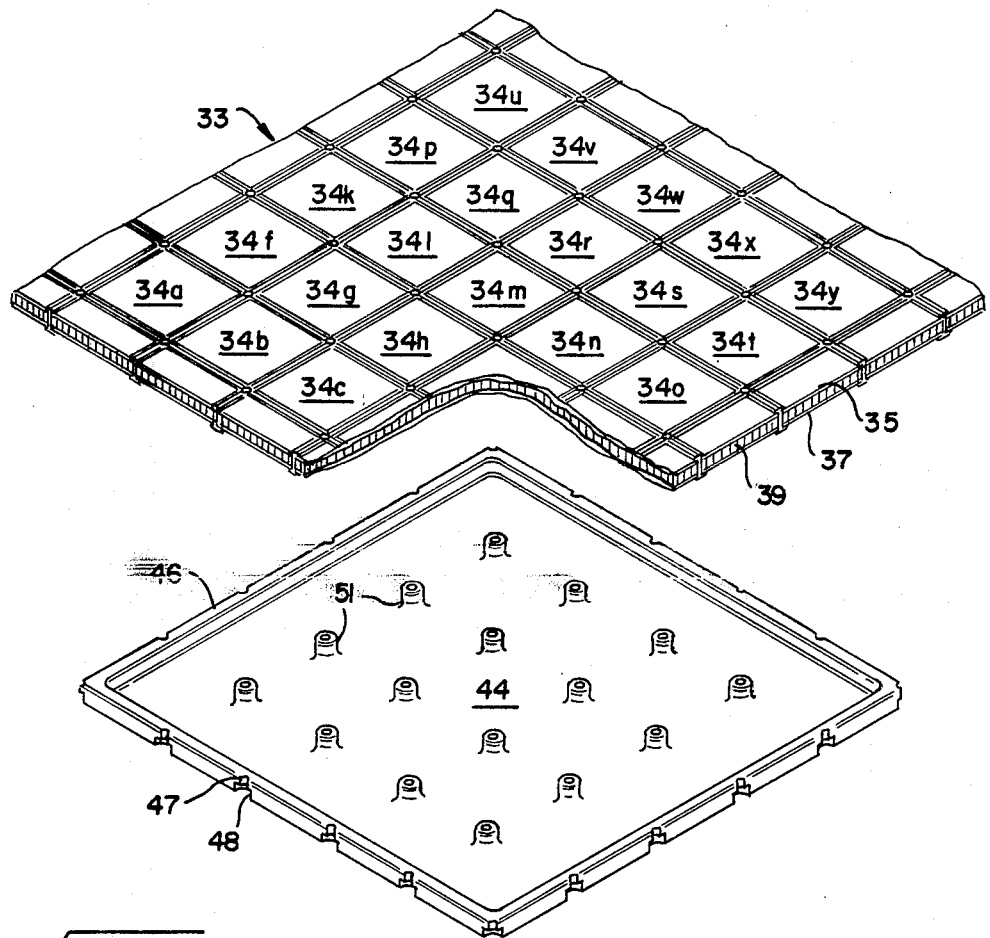
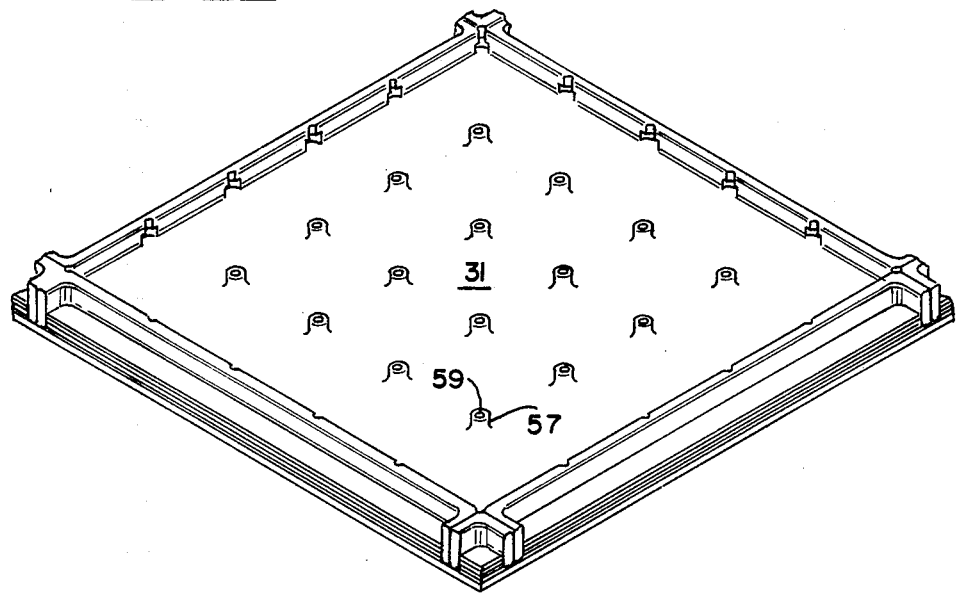
FIG 3B

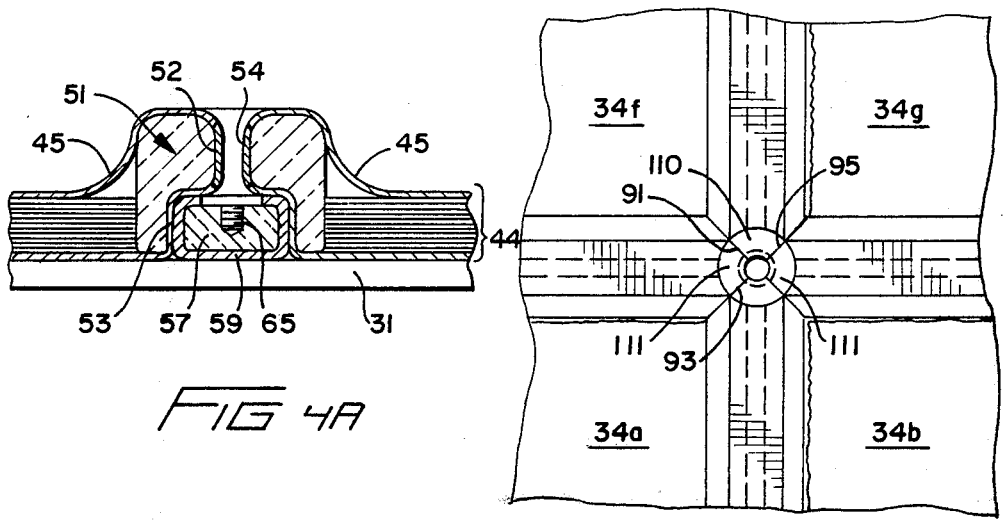
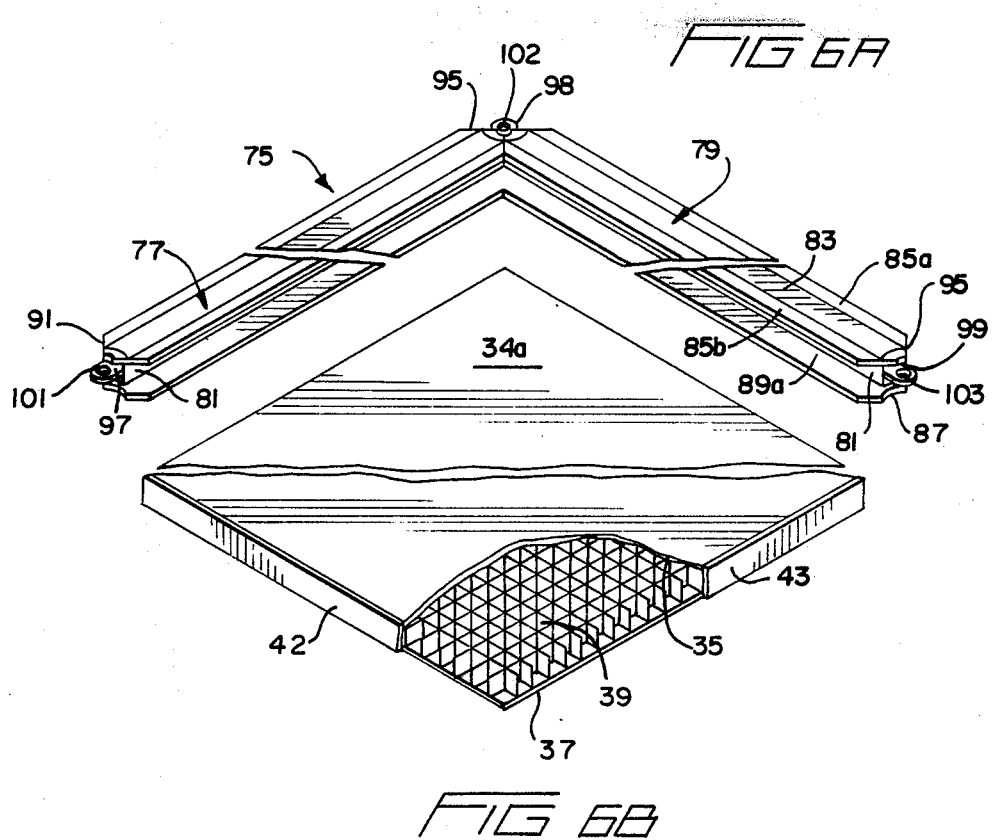

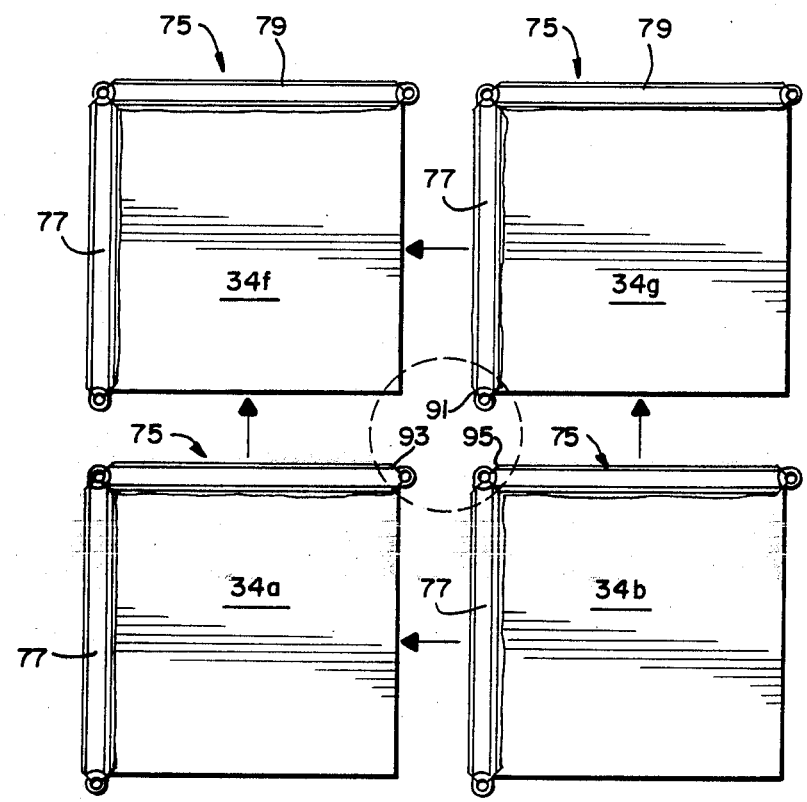
FIG 6C
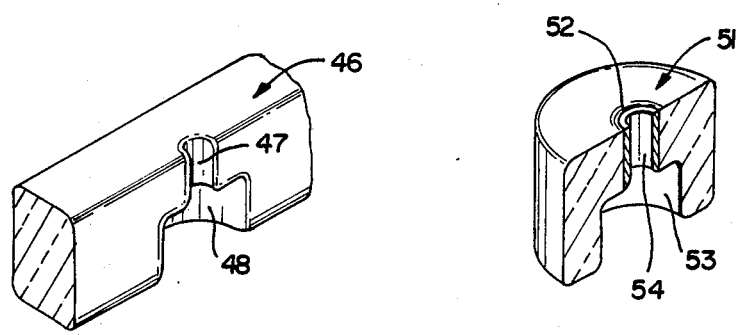
FIG 5
FIG 4B

HEAT RESISTIVE WALL ASSEMBLY FOR A SPACE VEHICLE

BACKGROUND OF THE INVENTION

This invention is generally concerned with a heat resistive barrier for use in a space vehicle, and is specifically concerned with a wall assembly that acts as a combination heat barrier and fuselage wall structure for use in a variety of aerospace vehicles, including reusable reentry vehicles, launch vehicle components, rocket boosters, and external tanks.

Heat barriers for protecting reusable space vehicles from the heat of reentering the atmosphere are known in the prior art. Such heat barriers may take the form of a ceramic tile used in the space shuttle of the United States space program. While the U.S. Space Shuttle has demonstrated that a ceramic tile type heat barrier can successfully protect the interior of the space vehicle from the heat of reentry, the use of such tiles is a major contributing factor to the high cost and the risks of space travel in at least five respects. First, the tiles themselves are relatively heavy and bulky compared to the other space-age materials which form the balance of the vehicle, which increases the overall weight of the vehicle and hence the amount of propellant needed to accelerate the vehicle to critical velocity. Secondly, the tiles are expensive to fabricate and difficult to adhere onto the fuselage of the vehicle. Thirdly, under certain atmospheric conditions, liquid water can collect beneath the tiles during reentry and tear them from the fuselage when the heat radiated by the tiles boils the water into steam. These last tiles must, of course, be replaced before the shuttle flies again, thereby necessitating the fabrication and adherence of still more of the expensive tiles. Fourthly, the ceramic tiles do not significantly assist the fuselage of the vehicle in achieving either structural strength, or the insulation of cryogenic fuel components from the harsh sunlight of space. Hence the fuselage must be provided with other structural components to give it the necessary tensile and buckling strengths, and must further be provided with cryogenic insulation structures that are entirely separate from the tiles. Finally, while the number of tiles that have been lost during past space shuttle missions has not been enough to jeopardize the thermal integrity of the vehicle, it is significant enough to call the long-term reliability of such a design into question.

Heat resistive wall structures for near-space vehicles are also known in the prior art, such as the fuselage wall of the X-15 rocket plane that was developed by North American Aviation, Inc. for NASA over twenty-five years ago. The X-15 wall structure relied primarily upon a combination of radiation cooling and a heat sink structure to resist heat. Such a wall structure has the advantage of doubling as both a structural wall and a thermal protection system for the vehicle. It is also easier to fabricate and to assemble than the tiles used in the space shuttle. But, while the use of Inconel ®as the outer skin of the fuselage did provide a relatively strong and reliable structure that resisted heat better than titanium or aluminum, this wall is relatively heavy, and not capable of safely withstanding heat fluxes of the magnitude associated with atmospheric reentry. Moreover, this prior art wall does not, by itself, provide any significant cryogenic insulation for the liquid oxygen and fuel components used in space vehicles. Nor could such a wall be easily modified to provide lightweight, cryogenic insulation, since the maximum temperature sustained by the Inconel ® skin would destroy internally added insulation.

Other types of heat resistive insulation structures have been studied and laboratory tested by NASA such as stand-off radiation heat shields. These heat shields typically include an inner structural wall formed of aluminum, several inches of high-temperature insulation such as Refrasil ®, and a corrugated outer structural wall. While these structures offer a structurally strong heat barrier that can provide some cryogenic insulation, they are heavier than ceramic tiles, and bulkier. Clearly, there is a need for a heat resistive wall capable of resisting the heat fluxes associated with reentry but which retains all the advantages associated with heat-resistive fuselage walls of rocket plane type vehicles. Such a wall structure should have a high tensile and buckling strength to minimize the need for reinforcing components that would add weight to the vehicle. It would be desirable if the wall had an inner component of high thermal conductivity and heat capacity so that any localized areas of high heat flux are quickly absorbed and distributed over wider portions of the entire structure. Ideally, such a wall structure should have the ability of effectively insulating cryogenic fuel and oxidizer components during the prelaunch period and from the harsh sunlight of space so that the necessity of separate cryogenic insulation structures is minimized. Finally, the heat resistive wall should be easy to assemble, highly mechanically reliable, extremely lightweight and easily repairable in the event of localized damage.

SUMMARY OF THE INVENTION

Generally speaking, the invention is a heat resistive wall assembly for a space vehicle that serves in part as both a thermal protection system and a load bearing aerodynamic component while achieving all of the aforementioned advantages. The heat resistive wall assembly of the invention may form the fuselage of such a vehicle, and comprises an inner wall formed from a metal such as beryllium or aluminum, an outer wall formed from a heat resistive metal such as Inconel ®, Rene-41, Haynes 25 or, in the cooler areas, titanium which is mounted over the inner wall in spaced relation thereto, and at least one evacuated jacket of resilient nickel foil disposed between the inner and outer sheets for retarding the radiant, convective and conductive transmission of heat through the wall assembly. The inner wall provides structural support for the vehicle and also acts as a heat sink for both absorbing heat transmitted from the outer wall and for equilibrating the heat gradients. The outer wall radiates away most of the heat applied to the outer surface of the vehicle.

In the preferred embodiment of the invention, the inner wall is formed from wrought beryllium having a guaranteed elongation of at least 8% due to the high strength, high heat capacity, high thermal conductivity and low density of this metal. Aluminum may also be used to form the inner wall where the anticipated heat loads are less and where lower cost is desired. The outer wall may be interfitting panels of Inconel ® 617 that have been flame-sprayed with a dark ceramic material for both giving them an emissivity coefficient of 0.60 or higher and for further minimizing the catalytic interaction between the outer surface of the heat resistive wall and the upper atmosphere during the heat of reentry. The minimization of such catalytic interaction discourages the recombination of ionized gases that form during reentry and thus decreases the heat load on the wall assembly. The evacuated jacket of nickel foil contains alternating sheets of nickel foil and nonwoven quartz fiber sheet material. The space between the inner and outer walls that is not contained within the evacuated jacket is vented to the ambient atmosphere.

The evacuated jacket may include a jacket support frame around its perimeter for both lending support to the jacket and for facilitating the mounting of the jacket over the inner wall. The jacket support frame is provided around its perimeter with a configuration of semicylindrical bores and recesses that are complementary in shape to spacer post assemblies which serve both to mount the jacket against the inner wall, as well as to secure the outer wall over the inner wall in spaced relation thereto. A plurality of uniformly spaced through-hole supports are disposed within each of the evacuated jackets for providing openings through the jackets through which other spacer post assemblies may extend.

Each of the spacer post assemblies includes a button-shaped, ceramic stand-off which receives a support pin formed from Inconel ® 617. The ceramic stand-off is aluminum brazed to the inner wall through the intermediary of an annular titanium bracket. The bottom end of each of the support pins screws into a threaded bore centrally located within the button-shaped stand-off. The central section of each pin includes a disc-shaped retainer for preventing the flexible evacuated jacket from coming into contact with the outer wall, as well as a spacing head for spacing the outer wall from the wall sheet. The top end includes a threaded bore for receiving an outer wall retention screw.

To facilitate both the assembly and the repair of the outer wall, the outer wall is preferably formed from a plurality of heat resistive panels, each of which is formed from a honeycomb of Inconel ® 617 foil sandwiched between square sheets of the same material. A rail assembly including a pair of orthogonally disposed rail members is welded along two adjacent sides of each of the square panels. The recesses defined by the rail members allow adjacent panels to be interfitted in "ceiling tile" fashion. Additionally, each of the corners of the rail assemblies includes eyelets capable of receiving the upper ends of the support pins of the spacer post assemblies so that when adjacent panels are interfitted and the eyelets are placed in registry with the support pins, the panel retaining screws that are receivable with the threaded bores on the upper ends of the support pins will securely mount the panels onto a unitized outer wall.

During liftoff, when the heat resistive wall assembly is exposed to ambient atmospheric pressure, the evacuated jacket offers its least amount of heat insulation, as the nickel foil which forms the jacket envelope is squeezed into contact with the interleaving layers of quartz fibers and foil contained therein. However, this is of little consequence as the heat load upon the heat resistive wall is minimal during liftoff when the speed of the vehicle is relatively slow in the atmosphere. When the vehicle reaches the upper atmosphere and finally deep space, the evacuated jacket expands to take up over half of the space between the inner and the outer walls both as a result of the resiliency of the envelope of nickel foil forming the jacket, as well as the resiliency of the interleaving layers of nonwoven quartz material and crumpled nickel foil inside the jacket. During reentry, when the heat load which acts upon the outer wall of the wall assembly is at its maximum, the ambient atmospheric pressure is still so low as to apply only insignificant compressive forces upon the evacuated jacket. Hence the evacuated jacket stays expanded, and is able to successfully retard vast amounts of heat flux when the heat load upon the wall is at its highest. While the heat resistive wall assembly of the invention may be applied to any sort of space vehicle or vessel in general, the wrought beryllium embodiment finds particular application when used in combination with a reusable orbital reentry vehicle having a planform loading factor of 70-140 kg/m$^2$ while the aluminum embodiment is particularly useful as a thermal protection shield on reusable boosters.

BRIEF DESCRIPTION OF THE SEVERAL FIGURES

FIG. 1A is a plan view of an orbital reentry vehicle that the heat resistive wall assembly of the invention is particularly adapted for use in;

FIGS. 1B and 1C are rear and side views, respectively of the reentry vehicle illustrated in FIG. 1A;

FIG. 2A is an enlarged view of a portion of the fuselage of the reentry vehicle illustrated in FIG. 1A, showing the outer wall of the heat resistive wall assembly of the invention;

FIG. 2B is a side, sectional view of the wall assembly illustrated in FIG. 2A along the line 2B—2B;

FIG. 2C is an enlarged view of the area circled in FIG. 2B, showing how the flexible, evacuated jacket of the heat resistive wall assembly would appear when subjected to the ambient atmospheric pressure at sea level, and further showing how one of the spacer post assemblies would appear disposed between the jacket support frames of two evacuated jackets;

FIG. 2D is an enlarged cross-sectional side view of the heat resistive wall assembly illustrated in FIG. 2A along the line 2D—2D showing how one of the flexible, evacuated jackets of the wall assembly expands when subjected to the vacuum of space, and further illustrating one of the spacer post assemblies of the invention disposed within one of the throughhole supports of the evacuated jacket;

FIG. 3A is a sectional plan view of the heat resistive wall assembly of the invention, showing the various layers of each of the components of the wall;

FIG. 3B is a perspective, exploded view of a section of the heat resistive wall assembly of the invention;

FIG. 4A is a cross-sectional side view of one of the through-hole supports contained within one of the flexible, evacuated jackets as it would appear with a support post assembly disposed through it;

FIG. 4B is a side, cross-sectional view of one of the through-hole support illustrated in FIG. 4A apart from the jacket and the spacer post assembly;

FIG. 5 is a perspective view of a portion of a jacket support frame, illustrating the semicylindrical bores and recesses provided in this frame for receiving the stand-off and support pins of the spacer post assemblies of the invention;

FIG. 6A is an enlarged plan view of the corners of four interfitting outer wall panels, showing how the mitered ends of the rail assemblies fit together;

FIG. 6B is a perspective, exploded view of one of the outer wall panels and one of the rail assemblies of the invention, illustrating how the panel interfits within the orthogonal rail members which form the rail assembly, and FIG. 6C illustrates how the outer wall panels are interfitted and interconnected in "ceiling tile" fashion to form the outer wall of the wall sheet.

DETAILED DESCRIPTION OF THE PREFERRED EMBODIMENT

With reference now to FIG. 1A, 1B and 1C, wherein like numerals designate like components throughout all the several figures, the invention finds particular application within the fuselage 2 of a reentry vehicle 1 that serves the dual purposes of providing the primary supporting structure for the vehicle 1 as well as its primary thermal protection system.

The fuselage 2 of the preferred vehicle design is formed from the heat resistive wall assembly 3 of the invention and is generally cylindrical in shape. The fuselage 2 includes from its fore end to its aft end an equipment section 4, a crew and equipment compartment 5, a payload compartment 7, a fuel compartment 9, and an engine compartment 11. A fore bulkhead 13 separates the equipment section 4 from the crew and equipment compartment 5, while central bulkheads 15 and 17 separate the payload compartment 7 from the crew and equipment compartment 5 on one end and the fuel compartment 9 at the other end. An aft bulkhead 19 in turn separates the fuel compartment 9 from the engine compartment 11. In the preferred embodiment of the vehicle 1, each of the bulkheads is formed from a grid work of beryllium channel beams 3 to 6 millimeters thick which support beryllium panels having beryllium foil honeycombs disposed within their interiors. The edges of each of these panels are circumscribed with titanium close-outs which allow the edges of these bulkheads to be securely (brazed) onto) sealed against the beryllium surface which forms the interior of the fuselage 2 in an airtight joint. The heat resistive wall assembly 3 results in interior temperatures that are low enough to permit conventional organic seals for this purpose. The vehicle 1 preferably also includes fore airfoils 21a, 21b and aft airfoils 23a, 23b and 23c. These airfoils are preferably formed from aluminum brazed titanium honeycomb reinforced with sine-wave type titanium I-beams. The leading edges of each of these airfoils may further be formed by reinforced graphite in order to withstand the 2300 degree F. temperature that the relatively sharp leading edges of the airfoils may be subjected to during reentry. The saddle tanks 27 serve to contain the liquid oxygen that forms 62% of the gross mass of the vehicle. The saddle tanks uniformly distribute the gross mass of the vehicle and provide additional planform area that facilitates reentry. Additionally, the reentry vehicle 1, as a whole, has an unloaded planform loading factor of only about 70–85 kg/m² (or 14–18 lb.m.f./ft.sq.). Such a relatively low planform loading factor advantageously reduces the heat load on the fuselage 2 during reentry to a point where the inner sheet thereof may experience maximum temperatures of only about 160 degrees C. or 320 degrees F., and further advantageously reduces the landing velocity to only about 120 knots, thereby allowing the vehicle 1 to land on relatively short air strips in an emergency.

The heat resistive wall assembly 3 of the invention is generally formed from a continuous inner wall or sheet 31 of wrought beryllium, and an outer wall 33 constructed from a plurality of interfitting, square panels 34a–34y of a laminate of Inconel ® 617. The beryllium forming the inner wall 31 is preferably wrought for a guaranteed elongation of 10%, which is adequate for use as structural material for the fuselage 2 or airfoils 21a, 221b, 23a–c. The beryllium that forms the inner wall 31 is preferably also approximately 2.25 millimeters thick, for two reasons. First, wrought beryllium of such thickness has excellent resistance to local buckling. Secondly, beryllium of such thickness has considerable heat sink and conductive capabilities which greatly assists the wall assembly 3 in absorbing and equilibrating any heat flux that the wall assembly 3 is exposed to, thus avoiding the formation of localized "hot spots" in the fuselage 2 during reentry. The panels 34a–34y which form the outer wall 33 of the wall assembly 3 are each approximately 6 millimeters thick, and formed from a laminate of relatively thin top 35 and bottom 37 sheets of Inconel ® 617 which sandwich a core 39 formed from a square-celled honeycomb of Inconel ® 617 foil of nominally only 0.04 millimeters in thickness. Although not shown in any of the drawings, the top 35 and bottom 37 sheets of Inconel ® may be stiffened by corrugations to enhance the buckling strength of each panel. As is most evident in FIG. 6B, two adjacent edges of each of the panels 34a–34y are finished at their edges by means of close-outs 42 and 43, while the remaining two sides 40, 41 which are open are received and brazed within a rail assembly 75 in a manner which will be discussed in more detail hereinafter. While wrought beryllium is the preferred material for the inner wall 31, this wall 31 may also be formed from standard aircraft aluminum alloy well known in the art, depending upon the anticipated heat loads, and cost vs. efficiency tradeoffs. However, wrought beryllium is preferred since it has twice the specific heat capacity of aluminum, which for beryllium is approximately 0.42 large calories per kilogram per degree centigrade. Additionally, the panels 34a–34y which form the outer wall 33 may also be formed from a titanium laminate consisting of square top and bottom sheets of titanium which are aluminum brazed to the top and bottom sides of a square celled honeycomb core formed from titanium foil.

The heat resistive wall assembly 3 further includes a plurality of flexible, evacuated jackets 44 about 1 meter square disposed between the inner and the outer walls 31 and 33. The edges of these jackets 44 mutually abut to completely cover the inner wall 31, as may best be seen in FIGS. 3A and 3B. Each jacket 44 is formed from an evacuated envelope 45 preferably formed from nickel foil approximately 0.05 mm inches thick. Each of the envelopes 45 includes a jacket support frame 46 around its perimeter that is made from a lightweight, heat resistive material such as MinK 2000 ® molded insulation available from Johns-Manville located in New York, New York. As is best seen in FIG. 5, the support frame 46 within each of the envelopes 45 includes a plurality of regularly spaced, semicylindrical bores 47 and recesses 48. As will be discussed in more detail hereinafter, these semicylindrical bores 47 and recesses 48 are deliberately shaped to receive the components of the spacer post assemblies 55. Disposed within the interior of the envelopes 45 of each of the evacuated jackets 44 is insulation formed from interleaving layers of nickel foil 49, and thin sheets of nonwoven quartz or glass fibers 50. Such insulation formed from interleaving sheets of nickel foil 49 and quartz or glass fibers 50 is available under the trade name "Superinsulation 2" available from the Cryogenics Division of Linde Company (a division of Union Carbide) located in Los Angeles, California. Finally, a plurality of through-hole supports 51 are disposed within the envelope 45 of each of the flexible, evacuated jackets 44. These through-hole supports 51 are uniformly positioned throughout the envelope 45 in a square array. As may best be seen in FIGS. 3A, 4A and 4B, each of the through-hole supports 51 includes a cylindrical body which, like the jacket support frame 46, is preferably made of Min-K 2000 ®. Each of the supports 51 includes a bore 52 which leads into a cylindrical recess 53. The bore 52 is lined with a nickel sleeve 54 which is brazed or welded to the top and bottom sheets of the nickel foil envelope 45 of the jacket 44. In the preferred embodiment, the semicylindrical bores and recesses 47, 48 which are uniformly spaced around the outer edges of the jacket support frame 46 complement the square array of the through-hole supports 51 to define a plurality of mutually contiguous squares, each of which is approximately 200 millimeters along each side.

The absence of any conductive or convective medium such as air within the evacuated jackets 44, in combination with the nickel foil forming the envelope 45 and the interleaving sheets of nickel foil 49 and nonwoven quartz or glass fibers 50 within the envelope 45 renders each of the flexible, evacuated jackets 44 an extremely good insulator of convective, conductive and radiant heat fluxes. The support frame 46 not only facilitates the construction of the wall assembly 3 by supporting the envelope 45 of each of the jackets 44, but further serves to space apart the upper and lower sheets of the envelope when the jacket 44 is placed in the near vacuum conditions of space. The square array of through-hole supports 51 assist the support frame 46 in this function, which results in a uniform spacing between the top and bottom sheets of the envelope 45 when the jacket is relieved from atmospheric pressure. Such uniform spacing throughout the entire area of the envelope 45 advantageously helps to minimize heat shorts in the jacket 44 during reentry. While the evacuated jackets 44 have thus far been disclosed as separate, removal structures approximately one meter square apiece, it should be noted that the jacket structure could be integrated entirely with the inner wall 31 by braze-sealing the edges of adjacent square sheets of nickel foil to form a single large foil layer that envelopes the fuselage or other structure the wall assembly 3 is used to form. This single large sheet of foil could be further brazed to the disc-shaped retainers of the support pins used in the wall assembly 3 which will be described in detail presently. While the case of discrete, panel-like jackets 44 offers easier installation, easier isolation of leaks and easier repair, this second, integrated form of the jackets 44 offers minimal heat shorts and hence increased heat load capacity. A hybrid jacket form 44 is also contemplated which provides air-tight closeouts in regions of the fuselage where some penetration is necessary, such as doorways and landing wells.

As is best seen in FIGS. 2C and 3A, spacer post assemblies 55 are disposed in both the semicylindrical bores and recesses 47, 48 of the frames 46 of mutually abutting jackets 44, as well as within the bores and cylindrical recesses 52, 53 of each of the previously discussed through-hole supports 51. Each of these spacer post assemblies 55 includes a ceramic, button-shaped stand-off 57 received within a titanium bracket 59 that is in turn secured to the beryllium inner wall 31 by brazing. The button-shaped stand-off 57 and brackets 59 are preferably complementary in shape to the recesses 48 and 53 of the support frames 46 and through-hole supports 51, respectively. In lieu of titanium bracket 59, the bottom surface of the buttonshaped stand-offs 57 may be metalized and brazed directly onto the beryllium inner wall 31. Each of the spacer post assemblies 55 further includes a support pin 61 formed from a heat-resistant metal alloy, such as the same Inconel ® 617 that forms the panels 34a–34y of the outer sheet 33. The bottom end of each of the support pins 61 terminates in a male thread 63 that is engageable within a threaded bore 65 concentrically located within the button-shape stand-off 57. The middle portion of each of these support pins 61 includes an integrally formed, disk-shaped retainer 67 which retains and spaces a circular section of the upper sheet of the envelope 45 of each of the flexible, evacuated jackets 44. Located just above the retainer 67 of the pin 61 is an integrally formed spacing head 69. The spacing head 69 supports the interlocking rail assemblies 75 which frame and secure the panels 34a–34y which form the outer wall 33, and further serves to space these panels 34a–34y a sufficient distance away from the upper sheet of the envelopes 45 of the evacuated jackets 44 to insure that these panels do not generally come into direct contact with the foil envelopes 45. At its top end, the support pin 61 includes a female thread 71 that receives a panel mounting screw 73. As will be explained in more detail hereinafter, the mounting screw 73 secures the top end of the pin 61 into linking relationship with the eyelets that extend from the mitered ends of abutting rail assemblies 75 in order to both interlock these rail assemblies 75, and to support and to secure the panels 34a–34y that form the outer wall 33. To facilitate installation of the jackets 44, each support pin 61 may include a screw-type joint (not shown) just beneath the disc-shaped retainer 67.

If the inner wall is contoured for integral stiffening o the side facing the jacket, then the receptacles for the support pins may be machined or otherwise formed into the inner wall, with or without ceramic inserts, thus eliminating any need in such places for brackets 59 or recesses 48. The mounting screw 73 may fit into a locking mechanism between it and female thread 71 or into a locking mechanism integrated into female thread 71.

With reference now to FIGS. 6A and 6B, each of the rail assemblies 75 includes a pair of orthogonally interconnected rail members 77 and 79. Each of the rail members 77, 79 includes a center support beam 81 that is integrally formed with an upper rail 83 having lateral flanges 85a, 85b and a lower rail 87 having lateral flanges 89a, 89b. The free ends of each of the rail members 77 and 79 include mitered portions 91 and 93, respectively, while the mutually interconnected ends of the rail members 77, 79 include a flat, diagonally disposed end 95. Eyelets 97, 98, and 99 extend from the mitered end portion 91, the flat, diagonal portion 95 and the mitered end portion 93 of the rail members, respectively. Each of the eyelets 97, 98 and 99 is integrally connected to the center support beam 81 of its respective rail member at different heights therealong, so that when the ends of three different rail assemblies 75 are placed in the abutting configuration illustrated in FIG. 6A, the eyelets 97, 98 and 99 will not mechanically interfere with each other, but instead will overlap each other (as illustrated in FIG. 2C and 2D) with their respective bores 101, 102 and 103 in registry. Bores 101 and 103 are elongated in the direction of their corresponding rail to accommodate relative thermal expansions. The ends of the upper rails 83 of each of the rail assemblies 75 each include screw hole sections 105, 106 and 107, as well as countersunk portions 109, 110 and 111 so that when the corners of adjoining rail assemblies 75 are placed into abutment as shown in FIG. 6A, a countersunk screw hole is formed which is capable of receiving the head of a panel securing screw 73.

FIG. 6C illustrates the manner in which the panels 34a-34y of the outer wall 33 are interfitted together by means of the rail assemblies 75. The open edges 40 and 41 of each of these panels is received within the recess formed by the upper and lower inner flanges 85a and 89a of each of the two rails 77 and 79, and the panel is welded to the rail assembly 75 by means of peripheral weld beads 113 and 114 which, while only shown on the top sheet 35 of each panel, are also present on the bottom sheet 37. The edges of each of the panels 34a-34y which are covered by close-outs 42 and 43 are then received in the recesses formed in adjacent rail assemblies by the outer flanges 85b, 89b present on each of the rail members 77 and 79. The outer wall 33 of the wall assembly 3 is assembled by taking a first panel 34a and inserting the top ends of three of the support pins 61 through eyelets 97, 98 and 99. Other panels 34b, 34g and 34f are interfitted together in "ceiling tile" fashion while simultaneously aligning the bores of their respective eyelets with the upper end of other support pins 61. After four such panels have been interfitted, a panel retaining screw 73 is inserted through the bore and countersunk portion formed by screw hole sections 105, 106 and 107 and countersunk portions 109, 110 and 111, and screwed into the female thread 71 located in the top end of the pin 61.

In operation, when the heat resistant wall is exposed to ambient atmospheric pressure, the evacuated jackets 44 are compressed into the position illustrated in FIG. 2C. As the compression of the jackets 44 shortens the heat path presented by the envelope 45 and further causes the interleaving sheets of nickel foil 49 and non-woven quartz or glass fibers 50 to come into contact with one another, the ability of the heat resistive wall 3 to obstruct type heat fluxes is, of course, greatly curtailed. But such curtailment presents no significant problems at this juncture since the heat load applied to the wall assembly 3 by either friction from the atmosphere or by the harsh sunlight of space is minimal. And even though the insulating properties of the wall assembly 3 are lowest prior to lift-off, it still offers a significant amount of cryogenic insulation for the liquified gases in the tanks 9 and 27. When the heat resistive wall assembly 3 is either in space or in the upper levels of the atmosphere, the evacuated jackets 44 disposed between the inner and outer walls 31 and 33 assume the expanded position illustrated in FIG. 3A which, of course, provides an extremely effective insulation against all forms of heat flux. Hence, the jackets 44 within the wall assembly 3 will provide excellent insulation against the intense sunlight of space for any remaining cryogenic fuel components disposed within the fuselage 2 of the vehicle 1. During reentry into the upper atmosphere (which is the juncture at which the space vehicle 1 will experience the greatest increase in temperature), the applicant has determined that the panels 34a-34y forming the outer wall 33 will prevent most of the resulting heat flux from entering the space between the inner 31 and outer 33 walls by radiating this heat back into space. The applicant has also determined that the ambient atmospheric pressure and ambient pressure behind the shock waves are sufficiently low that the evacuated jackets 44 will continue to be expanded into substantially the position illustrated in FIG. 3A, thus creating a formidable barrier for the heat flux that does penetrate the outer wall 33. Hence the heat resistive wall assembly 3 provides all of the thermal insulation advantages associated with evacuated wall designs at the time when the need for maximum amounts of insulation is the most critical. Moreover, it accomplishes this significant objective without rigid, evacuated wall structures which would be prohibitively heavy and which could buckle and implode when the vehicle reaches sea level. Finally, the high specific strength of the wrought beryllium forming the inner wall 31 provides the fuselage 2 of the vehicle 1 with ample resistance to the tensile, shear and buckling forces that the atmosphere and other factors apply to the vehicle 1.

To prevent ambient air from being liquified by the liquid hydrogen stored in the fuel tank 9, gaseous helium may be introduced between the inner wall 31 and outer wall 33 in the time period prior to liftoff.

I claim:

1. A heat resistive wall assembly for a space vehicle, comprising:
    a. an inner wall formed from a heat resistive metal for providing both structural support for the vehicle and a heat sink for absorbing and dissipating heat applied to the outer surface of the vehicle;
    b. an outer wall formed from a heat resistive metal mounted over said inner wall in spaced relation thereto for radiating away heat applied to the outer surface of the vehicle, and
    c. at least a first resilient, evacuated insulator means disposed between said inner and outer walls to retard the radiant transmission of heat through said wall structure,
    wherein the space between the inner and said outer wall is vented so that said outer wall bears no atmospheric pressure load, and wherein the resiliency of said insulator means causes it to define a lengthened heat path between said inner and outer wall when ambient atmospheric pressure is relieved.

2. A heat resistive wall assembly as defined in claim 1, wherein said insulator means includes a first flexible, heat reflective sheet that forms an evacuated jacket.

3. A heat resistive wall assembly as defined in claim 2, further including at least one jacket support frame for supporting a portion of said first flexible reflective sheet a minimum selected distance from said inner wall in order to define a heat path having a selected minimum length.

4. A heat resistive wall assembly as defined in claim 3, further including at least one support post means for mounting the outer wall over the inner wall, wherein said mounting means is located in the vicinity of said jacket support means to minimize the heat flux conducted through the wall in the area surrounding the support post means.

5. A heat resistive wall assembly as defined in claim 2, further including a plurality of additional flexible reflective sheets disposed between said first flexible refleCtive sheet and said inner wall for further retarding the radiant transmission of heat.

6. A heat resistive wall assembly as defined in claim 1, wherein said outer wall is flame sprayed with a dark ceramic material to enhance the emissivity of the outer wall and to retard any catalytic interaction between the metal forming the outer wall and the atmosphere during reentry, and wherein said outer wall is integrally stiffened by corrugations to enhance the buckling strength thereof.

7. A heat resistive wall assembly as defined in claim 1, wherein said inner wall is formed from beryllium sufficiently wrought to have an elongation of at least eight percent.

8. A heat resistive wall assembly for a reusable aerospace vehicle capable of traveling between outer space and an atmosphere comprising:
   a. an inner wall for providing both structural support for the vehicle and a heat sink for absorbing and dissipating heat applied to the outer surface of the vehicle;
   b. an outer wall formed from a heat resistive metal mounted over said inner wall in spaced relation thereto for radiating away heat applied to the outer surface of the vehicle, the space between said inner and outer wall being vented so that said outer wall bears no atmospheric pressure load, and
   c. a flexible, evacuated jacket formed from an envelope of resilient metallic foil having a top sheet and a bottom sheet, said jacket being disposed between said inner and outer walls, wherein the resiliency of said metallic foil causes the top and bottom sheets to separate and to define a lengthened heat path when ambient atmospheric pressure is relieved and to retard the radiative, conductive and convective transmission of heat between said inner and outer walls.

9. A heat resistive wall assembly for a reusable space vehicle as defined in claim 8, wherein said evacuated jacket includes a jacket support frame for spacing apart the edges of the top and bottom sheets that form the jacket a selected distance.

10. A heat resistive wall assembly for a reusable space vehicle as defined in claim 8, wherein said jacket further includes a plurality of interleaving sheets of flexible, heat reflective metal foil and sheet material made from quartz fibers for further retarding the radiative transmission of heat.

11. A heat resistive wall assembly for a reusable space vehicle as defined in claim 9, further including at least one support post means for mounting and spacing said outer wall over said inner wall, wherein said support post means is located adjacent to said jacket support frame thereby partially offsetting the heat flux transmitted through the wall in the vicinity of the support post means as a result of heat radiation.

12. A heat resistive wall assembly for a reusable space vehicle as defined in claim 8, wherein said outer wall is formed from an alloy that includes nickel.

13. A heat resistive wall assembly for a reusable space vehicle as defined in claim 12, wherein said outer wall is formed from Inconel ® 617.

14. A heat resistive wall assembly for a reusable space vehicle as defined in claim 8, wherein said outer wall is formed from an alloy of titanium, and flame sprayed with a dark ceramic material to enhance emissity and to retard catalytic interaction between the titanium forming the outer wall and the atmosphere during reentry.

15. A heat resistive wall assembly for a reusable space vehicle as defined in claim 11, wherein said support post means includes a support pin formed from a nickel alloy.

16. A heat resistive wall assembly for a reusable space vehicle as defined in claim 8, wherein said envelope of said evacuated jacket is formed from nickel foil.

17. a heat resistive wall assembly for a fuselage of a reusable space vehicle capable of traveling between an atmosphere and outer space comprising:
   a. an inner wall formed from a metal for providing both structural strength to the fuselage, and a heat sink for absorbing and dissipating heat applied to the fuselage during reentry into said atmosphere;
   b. an outer wall formed from a heat resistive metal mounted over said inner wall in spaced relation thereto for radiating away a substantial portion of the heat applied to the fuselage during reentry;
   c. a first, resilient heat reflective sheet disposed between said inner and outer walls for both retarding the radiant transmission of heat through said wall, and for forming a jacket within the wall assembly that fills part of the space between said inner and outer walls and which is at least partially evacuated for retarding the convective transmission of heat through the wall, wherein the resiliency of said metallic foil causes said resilient sheet to contract when not exposed to ambient atmospheric pressure and to define a lengthened heat path between said outer and inner walls, and
   wherein the space between the inner and outer walls that is not contained within said jacket is vented to the atmosphere for equalizing the ambient atmospheric pressure on both sides of the outer wall to prevent said wall from buckling.

18. A heat resistive wall assembly for a reusable space vehicle as defined in claim 17, further including a jacket support frame for supporting the upper edges of the first resilient, heat reflective sheet a selected distance from said inner wall.

19. A heat resistive wall assembly for a reusable space vehicle as defined in claim 18, wherein said first resilient, heat reflective sheet is formed from a nickel foil sheet which is stretched over and sealingly connected to said jacket support frame.

20. A heat resistive wall assembly for a reusable space vehicle as defined in claim 19, wherein said jacket includes a plurality of other heat reflective sheets interleaved between a plurality of spacing sheets formed from fibers of a nonwoven refractory material.

21. A heat resistive wall assembly for a reusable space vehicle as defined in claim 20, wherein the resiliency of the nickel foil sheet defining the evacuated jacket causes it to draw away from the inner sheet when the vehicle is in either outer space or in a rarified portion of the atmosphere, whereby the heat path defined between the nickel foil sheet and the inner wall becomes substantially the same length throughout all portions of said foil sheet.

22. A heat resistive wall assembly for a reusable space vehicle as defined in claim 17, further including a plurality of support post means for securing and spacing said outer wall over said inner wall.

23. A heat resistive wall assembly for a reusable space vehicle as defined in claim 22, wherein said support post means includes a support pin formed from a heat resistive alloy to minimize the heat flux conducted therethrough, a metal bracket fastened to said inner wall, and a ceramic stand-off received within said bracket having an opening for receiving said pin.

24. A heat resistive wall assembly for a reusable space vehicle as defined in claim 17, wherein said inner wall is formed from a sheet of beryllium that has been wrought so that is has an elongation of at least 8%.

25. A heat resistive wall assembly for a reusable space vehicle as defined in claim 17, wherein said outer wall is formed from a plurality of interconnected panels of heat resistant metal.

26. A heat resistive wall assembly for a reusable space vehicle as defined in claim 25, including rail means having opposing recesses for receiving and interconnecting adjacent edges of two different panels, and for lending structural strength to said outer wall.

27. A heat resistive wall assembly for a reusable space vehicle as defined in claim 23, wherein said inner wall is formed from aluminum, and said metal bracket is fastened thereto by aluminum brazing.

28. A heat resistive wall assembly for a reusable space vehicle as defined in claim 26, wherein said panels are formed from an alloy containing nickel.

29. A heat resistive wall assembly for a reusable space vehicle as defined in claim 26, wherein said panels are formed from an alloy containing titanium.

30. A heat resistive wall assembly for a reusable space vehicle as defined in claim 26, wherein each of said panels includes a core formed from a honeycomb of metallic foil.

31. A reusable space vehicle for traveling between space and the atmosphere, comprising a fuselage having a planform loading factor of between about 50–100 kilograms per meter squared for limiting the amount of heat that the fuselage is subjected to during reentry into the upper level of said atmosphere, wherein the fuselage includes an inner wall of heat resistive metal for providing structural strength to the vehicle and for absorbing and dissipating heat, an outer wall of heat resistive metal mounted over said inner wall in spaced relation thereto, wherein the space defined between the inner and outer walls is at least partially evacuated to retard the convective transmission of heat, and wherein said fuselage also includes at least a first, resilient heat reflective sheet disposed between said inner and outer walls which defines an evacuated space between itself and said inner wall whose resiliency causes it to draw away from the inner wall to form a lengthened heat path between said inner and outer walls when ambient atmospheric pressure is relieved to retard the radiant transmission of heat between said outer and inner walls.

32. A reusable space vehicle as defined in claim 31, wherein the space between said first flexible, heat reflective sheet and said outer wall is vented to the atmosphere to minimize the pressure load that said atmosphere exerts onto said outer wall.

33. A reusable space vehicle as defined in claim 32, wherein said resiliency of said first flexible, heat reflective sheet maintains said heat reflective sheet in spaced relationship to said inner wall when said wall initially reenters the upper level of said atmosphere.

34. A reusable space vehicle for traveling between space and the atmosphere, comprising a fuselage having a planform loading factor of between about 50 to 100 kilograms per meter squared for limiting the amount of heat that the fuselage wall is subjected to during reentry into the upper level of the atmosphere, wherein the fuselage includes an inner wall that defines the interior of the fuselage for providing all necessary structural strength to the vehicle, and for absorbing and dissipating the heat of reentry, an outer wall of heat resistive metal mounted over said inner wall in spaced relation thereto for radiating a substantial portion of the heat of reentry away from said inner wall, and a first flexible, heat reflective sheet disposed between said inner and outer walls for both retarding the radiant transmission of heat to said inner wall, and for defining a jacket within said fuselage that is at least partially evacuated for retarding the convective transmission of heat to said inner wall, wherein the exterior of said jacket is exposed to ambient air pressure, and wherein said first flexible, heat reflective sheet resiliently spaces itself away from said inner wall when said fuselage leaves the atmosphere and enters outer space, and maintains said spaced relationship during reentry into the upper level of the atmosphere despite being subjected to ambient air pressure associated with said upper level of said atmosphere.

* * * * *